United States Patent
Xiong et al.

(10) Patent No.: US 9,307,058 B2
(45) Date of Patent: Apr. 5, 2016

(54) NEGOTIATION METHOD AND ELECTRONIC APPARATUS USED IN ETHERNET CHANNEL OF HIGH DEFINITION MULTIMEDIA INTERFACE

(75) Inventors: Zhihui Xiong, Suzhou (CN); Dongyun Chen, Suzhou (CN); Mingzhe Tang, Suzhou (CN); Zhidao Wang, Suzhou (CN)

(73) Assignee: Realtek Semiconductor Corp., Science Park, HsinChu (TW)

( * ) Notice: Subject to any disclaimer, the term of this patent is extended or adjusted under 35 U.S.C. 154(b) by 203 days.

(21) Appl. No.: 13/441,011

(22) Filed: Apr. 6, 2012

(65) Prior Publication Data

US 2012/0257638 A1   Oct. 11, 2012

(30) Foreign Application Priority Data

Apr. 8, 2011 (CN) .......................... 2011 1 0088657

(51) Int. Cl.
 H04L 12/66 (2006.01)
 H04L 29/06 (2006.01)
(52) U.S. Cl.
 CPC ...................................... *H04L 69/24* (2013.01)
(58) Field of Classification Search
 None
 See application file for complete search history.

(56) References Cited

U.S. PATENT DOCUMENTS

| | | | |
|---|---|---|---|
| 7,242,693 B1 * | 7/2007 | Acharya | H04L 12/40136 370/445 |
| 7,428,586 B2 | 9/2008 | Sutherland | |
| 8,181,060 B1 * | 5/2012 | Day | H04L 12/24 370/230 |
| 2004/0203441 A1 * | 10/2004 | Smith | H04W 24/00 455/67.11 |
| 2005/0243058 A1 * | 11/2005 | Morris et al. | 345/158 |
| 2008/0037465 A1 * | 2/2008 | Ngo | H04L 1/06 370/329 |
| 2008/0175142 A1 * | 7/2008 | Uematsu | 370/220 |
| 2008/0291324 A1 | 11/2008 | Hong | |
| 2010/0124188 A1 * | 5/2010 | Wu | H04W 74/002 370/328 |
| 2010/0124196 A1 * | 5/2010 | Bonar | H04B 7/0689 370/329 |
| 2010/0161741 A1 * | 6/2010 | Jiang | H04L 63/02 709/206 |
| 2011/0013589 A1 * | 1/2011 | Wu | 370/331 |

FOREIGN PATENT DOCUMENTS

CN          1836404 A        9/2006

* cited by examiner

*Primary Examiner* — Kwang B Yao
*Assistant Examiner* — Hardikkumar Patel
(74) *Attorney, Agent, or Firm* — Winston Hsu; Scott Margo

(57) ABSTRACT

A negotiation method used in a high definition multimedia interface (HDMI) is provided. The negotiation method includes: transmitting a first negotiation signal from a first side to a second side during a first specific time period for enabling negotiation of an HDMI Ethernet Channel (HEC); and checking whether any negotiation signal sent from the second side is received by the first side for determining a result of the negotiation. The first negotiation signal includes parameters of Energy Efficient Ethernet (EEE) or parameters of flow control at least. Any packet of the negotiation signal excludes a data field of Start Frame Delimiter (SFD), and therefore the packet can be applied for point-to-point transmission and compatible with the Physical layer.

18 Claims, 4 Drawing Sheets

NEGOTIATION METHOD AND ELECTRONIC APPARATUS USED IN ETHERNET CHANNEL OF HIGH DEFINITION MULTIMEDIA INTERFACE

TECHNICAL FIELD

The disclosure relates to a transmission scheme employed in a multimedia interface.

DESCRIPTION OF THE RELATED ART

In general, functions of HDMI Ethernet channel (HEC) have been formulated in a newer version of HDMI specification. The formulation of the functions of HDMI Ethernet channel is based on Ethernet standards 100BASE-TX of IEEE 802.3 specification. However, the implementation of Physical layer of HDMI Ethernet channel is different from that of Ethernet standards described in IEEE 802.3 specification. One of the differences is that the HDMI Ethernet channel does not support a negotiation function/operation. Due to the lack of the negotiation function/operation, functions such as flow control and implementation of Energy Efficient Ethernet (EEE) are not provided with two connection entities at two sides of the HDMI. It becomes difficult to implement the functions of flow control and transmission control of EEE.

BRIEF SUMMARY

Therefore, one of the objectives of the disclosure is to provide a negotiation method used in a multimedia interface and corresponding electronic apparatus, to solve the problem mentioned above.

In an exemplary embodiment, a negotiation method used in a multimedia interface is disclosed. The negotiation method comprises: transmitting a first negotiation signal from a first side to a second side during a first specific time period when receiving any negotiation signal transmitted from the second side for enabling a negotiation of an Ethernet channel; transmitting a second negotiation signal from the first side to the second side during a second specific time period; and checking whether any negotiation signal from the second side is detected or not during the second specific time period for determining a result of the negotiation.

In an exemplary embodiment, a negotiation method used in a high-definition multimedia interface is disclosed. The negotiation method comprises: transmitting a first negotiation signal from a first side to a second side during a first specific time period for enabling negotiation of an Ethernet channel; and checking whether any negotiation signal transmitted from the second side is detected or not for determining a result of the negotiation; wherein the first negotiation signal comprises a parameter of Energy Efficient Ethernet (EEE) or a parameter of Ethernet flow control.

In an exemplary embodiment, an electronic apparatus used in a multimedia interface is disclosed. The electronic apparatus comprises a first side and a processing unit. The first side is utilized for transmitting or receiving a multimedia signal. The processing unit is coupled to the first side and utilized for processing the multimedia signal. The processing unit determines to transmit a first negotiation signal from the first side to a second side during a first specific time period for enabling a negotiation of an Ethernet channel when any negotiation signal transmitted from another device at the second side is received; and, the processing unit determines to transmit a second negotiation signal from the first side to the second side during a second specific time period, and checks whether a negotiation signal transmitted from the second side is detected or not during the second specific time period for determining a result of the negotiation.

In an exemplary embodiment, an electronic apparatus used in a high-definition multimedia interface is disclosed. The electronic apparatus comprises a first side and a processing unit. The first side is utilized for transmitting or receiving a multimedia signal. The processing unit is coupled to the first side and utilized for processing the multimedia signal. The processing unit determines to transmit a first negotiation signal from the first side to a second side during a first specific time period for enabling negotiation of an Ethernet channel, and to check whether any negotiation signal transmitted from the second side is detected or not for determining a result of the negotiation; and the first negotiation signal comprises a parameter of Energy Efficient Ethernet (EEE) or a parameter of Ethernet flow control.

In the embodiments mentioned above, when the electronic apparatuses and negotiation methods are applied for a high-definition multimedia interface (HDMI), the functions of negotiating one entity of one side of the HDMI with an entity of the other side and exchanging other control messages between the two sides of the HDMI can be easily achieved. In addition, in the embodiments, it is not necessary to modify Physical layer function of the Ethernet channel of the HDMI. In addition, packets of the negotiation signals are configured to be different from normal data packets of the Ethernet channel, and are merely used for negotiation of the Ethernet channel so that transmission/reception of negotiation packets is not treated as transmission/reception of normal data packets. In addition, functions of the negotiation between the two sides can include a negotiation function of Energy-Efficient Ethernet, a negotiation function of Ethernet flow control, or a user-defined negotiation function.

These and other objectives of the disclosure will no doubt become obvious to those of ordinary skill in the art after reading the following detailed description of the embodiment that is illustrated in the various figures and drawings.

DETAILED DESCRIPTION

Figure 1:
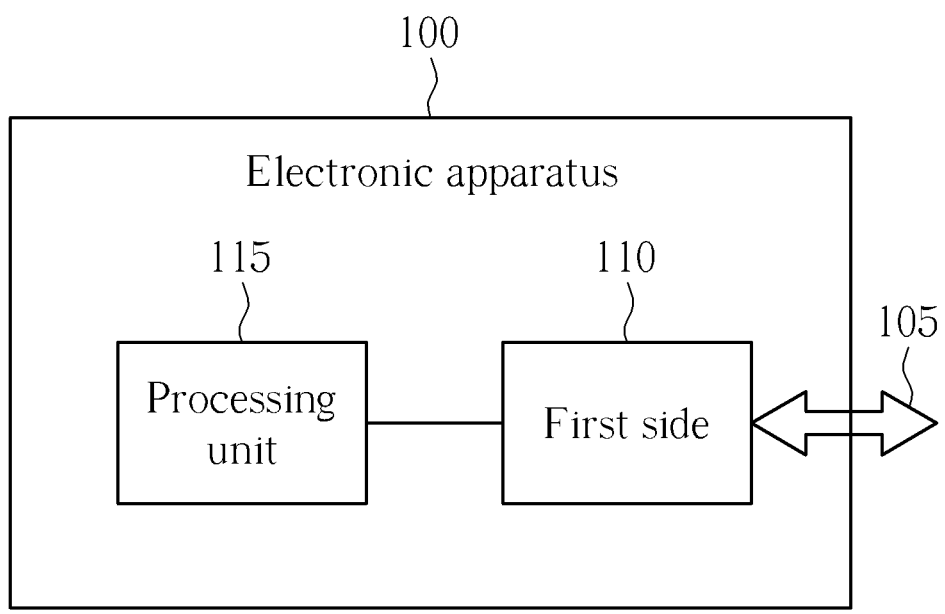
FIG. 1 a diagram of an electronic apparatus employed with a multimedia interface 105 in an exemplary embodiment.

Please refer to FIG. 1, which is a diagram of an electronic apparatus 100 employed with a multimedia interface 105 in an exemplary embodiment. The electronic apparatus 100 comprises a first side 110 and a processing unit 115. The multimedia interface 105 in this embodiment is a high-definition multimedia interface (HDMI). The first side 110 is used as a transceiver end used for transmitting or receiving a multimedia signal including video and audio, i.e. a high-definition multimedia signal. In addition, in this embodiment, the first side 110 is further used for receiving/transmitting Ethernet channel data packets of the HDMI 105, and the processing unit 115 is coupled to the first side 110 and used for processing the HDMI signal and corresponding data packets. In this embodiment, during data negotiation of Ethernet channel, the electronic apparatus 100 including a negotiation function is arranged to employ the processing unit 115 for controlling the first side 110 to transmit at least one negotiation signal to negotiate with another electronic apparatus such as an electronic device located at a second side (not shown in FIG. 1). If the other electronic apparatus also supports the negotiation function, then each of the electronic apparatus 100 and another electronic apparatus at the second side is arranged to negotiate with the other by mutually sending negotiation signals so as to determine data transmission control parameters of the Ethernet channel. For example, the control parameters included in the negotiation signals may be parameters of Energy-Efficient Ethernet, parameters of Ethernet flow control, or user-defined control parameters, etc. In this embodiment, a negotiation signal is transmitted via the Ethernet channel mentioned above. The negotiation signal is formed by a plurality of consecutive identical negotiation packets. For example, a negotiation signal is formed by ten consecutive identical negotiation packets. However, this is one of various implementations of the disclosure, and should not be intended to a limitation.

Figure 2A:
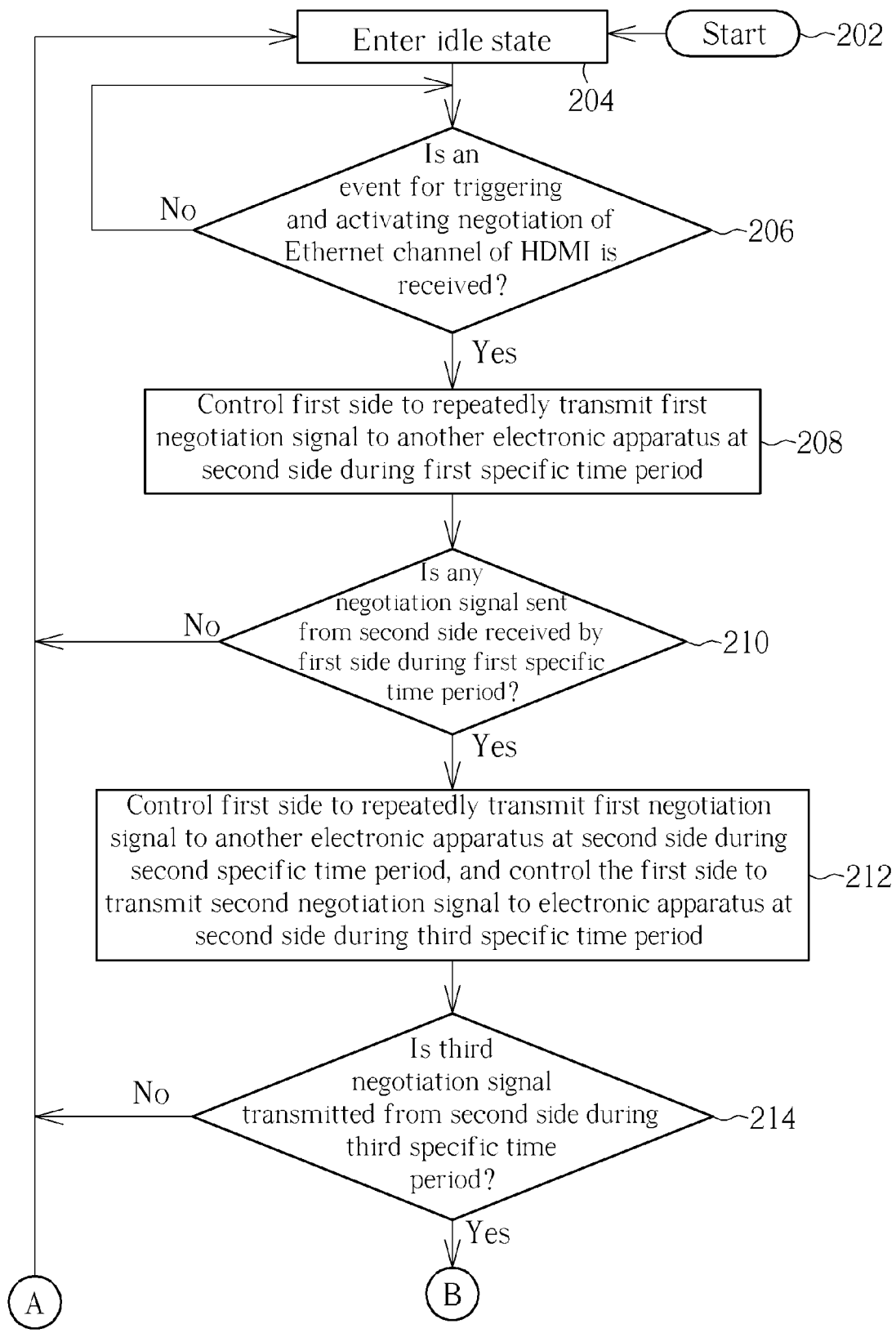
FIGS. 2A-2B are diagrams illustrating a flowchart of the operation of the electronic apparatus as shown in FIG. 1.
Figure 2B:
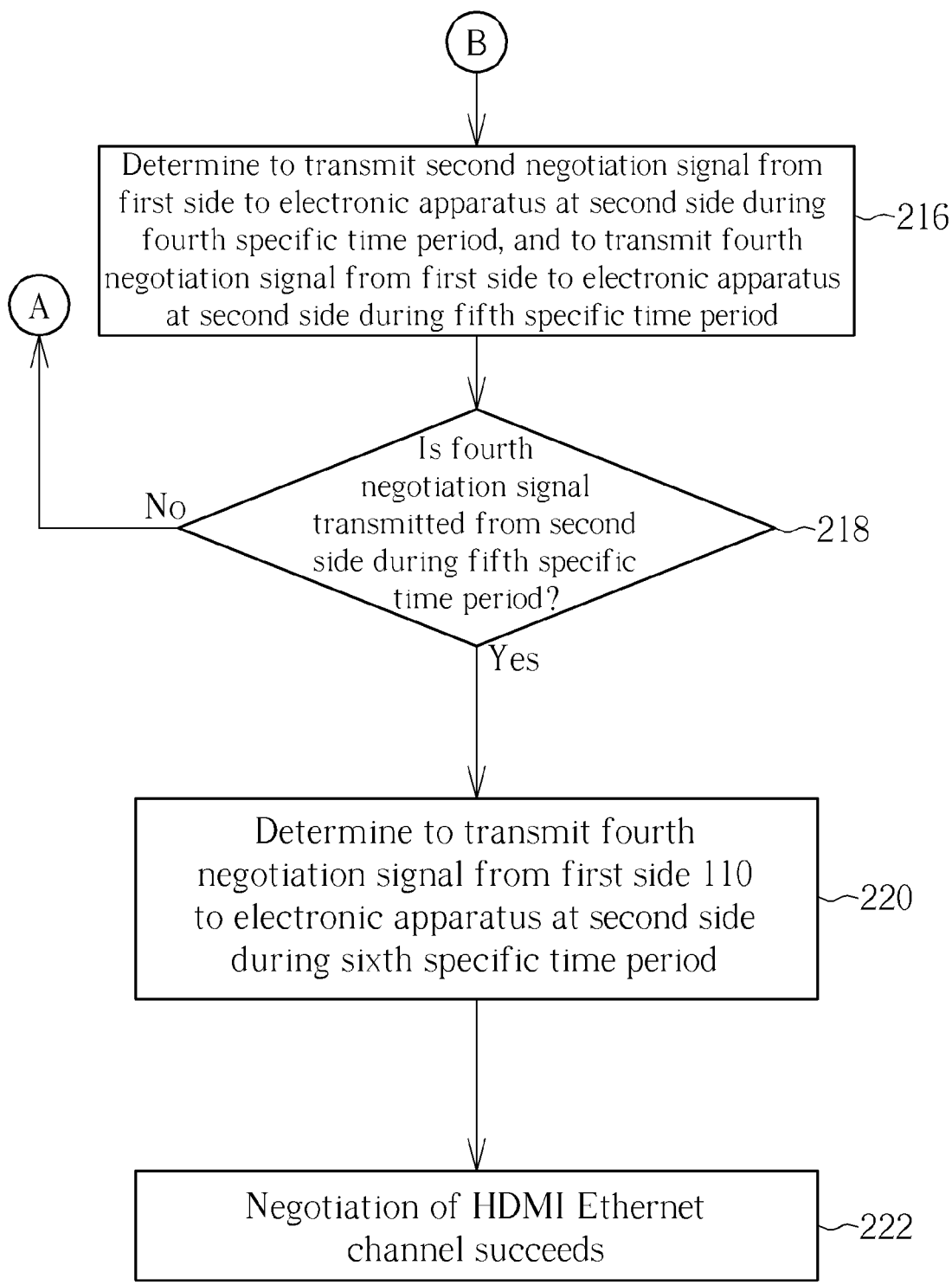

Please refer to FIG. 2A in conjunction with FIG. 2B. FIG. 2A and FIG. 2B illustrate a flowchart of the operation of the electronic apparatus 100 as shown in FIG. 1. Provided that substantially the same result is achieved, the steps of the flowchart shown in FIGS. 2A and 2B need not be in the exact order shown and need not be contiguous, that is, other steps can be intermediate. The description of steps is detailed in the following:

Step 202: Start;

Step 204: The electronic apparatus 100 enters idle state;

Step 206: Is an event for triggering and activating negotiation of HDMI Ethernet channel received or detected by the processing unit 115? If yes, the flow proceeds to Step 208; otherwise, the flow continues repeatedly checking whether the event is received/detected;

Step 208: The processing unit 115 controls the first side 110 to repeatedly transmit first negotiation signal to another electronic apparatus at the second side during the first specific time period;

Step 210: The processing unit 115 checks whether the first side 110 receives any negotiation signal sent from the second side. If a negotiation signal is received, this implies that the negotiation is started, and the flow proceeds to Step 212. Otherwise, if no negotiation signal is received, this implies that the negotiation is not enabled, and the flow proceeds back to Step 204;

Step 212: The processing unit 115 controls the first side 110 to transmit a first negotiation signal to another electronic apparatus at the second side during a second specific time period, to perform negotiation of Ethernet channel, and controls the first side 110 to transmit a second negotiation signal to the electronic apparatus at the second side during a third specific time period;

Step 214: The processing unit 115 checks whether a third negotiation signal is transmitted from the second side during the third specific time period. If the third negotiation signal is detected, this implies that the negotiation procedure still continues, and the flow proceeds to Step 216. Otherwise, if no third negotiation signal is detected, this implies that the negotiation procedure fails, and the flow proceeds to Step 204;

Step 216: The processing unit 115 determines to transmit the second negotiation signal from the first side to the electronic apparatus at the second side during the fourth specific time period, and to transmit a fourth negotiation signal from the first side 110 to the electronic apparatus at the second side during the fifth specific time period;

Step 218: The processing unit 115 checks whether the fourth negotiation signal is transmitted from the second side during the fifth specific time period. If the fourth negotiation signal is detected, this implies that the negotiation procedure still continues, and the flow proceeds to Step 220. Otherwise, if no fourth negotiation signal is detected, this implies that the negotiation procedure fails, and the flow proceeds to Step 204;

Step 220: The processing unit 115 determines to transmit the fourth negotiation signal from the first side 110 to the electronic apparatus at the second side during the sixth specific time period;

Step 222: Determine that the negotiation result of Ethernet channel of HDMI succeeds.

It should be noted that, in Step 204, the electronic apparatus 100 enters an idle state after initialization, and does not check whether to perform Ethernet channel negotiation function until Step 206 is performed. However, this is not intended to be a limitation of the disclosure. In another embodiment, the electronic apparatus 100 immediately checks whether to perform Ethernet channel negotiation function after initialization. This modification also falls within the scope of the disclosure. In addition, the event for triggering and activating negotiation of HDMI Ethernet channel is at least generated at these timings: after functions of Ethernet channel are initialized, when a user sends a command to indicate activation of Ethernet channel negotiation function, or when the first side 110 receives a negotiation signal transmitted from an electronic apparatus of the second side. That is, when at least one of the above-mentioned conditions is matched, the trigger event is generated, and Ethernet channel negotiation function is activated or enabled.

In addition, in this embodiment, the time interval of each specific time period is substantially identical to each other. However, in other embodiments, the time intervals can be designed to be different. In addition, the above-mentioned first negotiation signal is an initial negotiation signal generated by the first side 110 of the electronic apparatus 100, and the initial negotiation signal indicates that the electronic apparatus 100 including the first side 110 has not established a negotiation with another electronic apparatus at the second side and the electronic apparatus at the second side has not established a negotiation with the electronic apparatus 100. In practice, this can be implemented by an acknowledgement message. The initial negotiation signal is used for recording that the electronic apparatus 100 has not generated or transmitted an acknowledgement message to the electronic apparatus at the second side and the electronic apparatus at the second side has not generated or transmitted an acknowledgement message to the electronic apparatus 100. The fields ACK0 and ACK1 can be used for the implementation. The content of the field ACK0 is recorded as '0' when the electronic apparatus 100 has not generated an acknowledgement message to the electronic apparatus at the second side. The content of the field ACK1 is recorded as '0' when the electronic apparatus at the second side has not generated an acknowledgement message to the electronic apparatus 100. In other words, the acknowledgement message of the first negotiation signal can be represented by: ACK0=0, ACK1=0.

The second negotiation signal can used to indicate that the electronic apparatus 100 including the first side is establishing negotiation with another electronic apparatus at the second side and the electronic apparatus at the second side has not established a negotiation with the electronic apparatus 100. In practice, this can be implemented by an acknowledgement message. The second negotiation signal is used to record that the electronic apparatus 100 has generated an acknowledgement message to the electronic apparatus at the second side and the electronic apparatus at the second side has not generated an acknowledgement message to the electronic apparatus 100. This can be also represented by the fields ACK0 and ACK1. The content of the field ACK0 is recorded as '1' to indicate the electronic apparatus 100 generates an acknowledgement message to the electronic apparatus at the second side. The content of the field ACK1 is recorded as '0' to indicate that the electronic apparatus at the second side has not generated an acknowledgement message to the electronic apparatus 100. In other words, the acknowledgement message of the second negotiation signal can be represented by: ACK0=1, ACK1=0.

In addition, the third negotiation signal is used to indicate that the electronic apparatus 100 including the first side 110 is establishing a negotiation with another electronic apparatus at the second side whether the electronic apparatus at the second side determines to establish a negotiation with the electronic apparatus 100 or not. In practice, this can also be represented by an acknowledgement message. The third negotiation signal records that the electronic apparatus 100 generated an acknowledgement message to the electronic apparatus at the second side while the electronic apparatus at the second side may have generated an acknowledgement message to the electronic apparatus 100 or may have not generated an acknowledgement message to the electronic apparatus 100. This can be also represented by the fields ACK0 and ACK1. The content of the field ACK0 is recorded as '1' to indicate that the electronic apparatus 100 has generated an acknowledgement message to the electronic apparatus at the second side. The content of the field ACK1 can be recorded as '0' or '1'. In other words, the acknowledgement message of the third negotiation signal can be represented by: ACK0=1, ACK1=X, 'X' means a don't care bit.

In addition, the fourth negotiation signal can used to indicate that the electronic apparatus 100 including the first side 110 is establishing a negotiation with another electronic apparatus at the second side and the electronic apparatus at the second side is also establishing a negotiation with the electronic apparatus 100. In practice, this can be implemented by an acknowledgement message. The fourth negotiation signal is used for recording that the electronic apparatus 100 has generated an acknowledgement message to the electronic apparatus at the second side while the electronic apparatus at the second side has generated an acknowledgement message to the electronic apparatus 100. This can be also represented by the fields ACK0 and ACK1. The content of the field ACK0 is recorded as '1' to indicate that the electronic apparatus 100 has generated an acknowledgement message to the electronic apparatus at the second side. The content of the field ACK1 is recorded as '1' to indicate that the electronic apparatus at the second side has generated an acknowledgement message to the electronic apparatus 100. In other words, an acknowledgement message of the fourth negotiation signal can be represented by: ACK0=1, ACK1=1.

In addition, each negotiation signal can be formed by using a plurality of identical negotiation packets, and each negotiation packet is used to record acknowledgement information. This acknowledgement information is implemented by bits, flags, or data fields such as ACK0 and ACK1, and the acknowledgement information can be used to indicate whether the first side transmits an acknowledgement message or not and the second side transmits an acknowledgement message or not.

Figure 3:
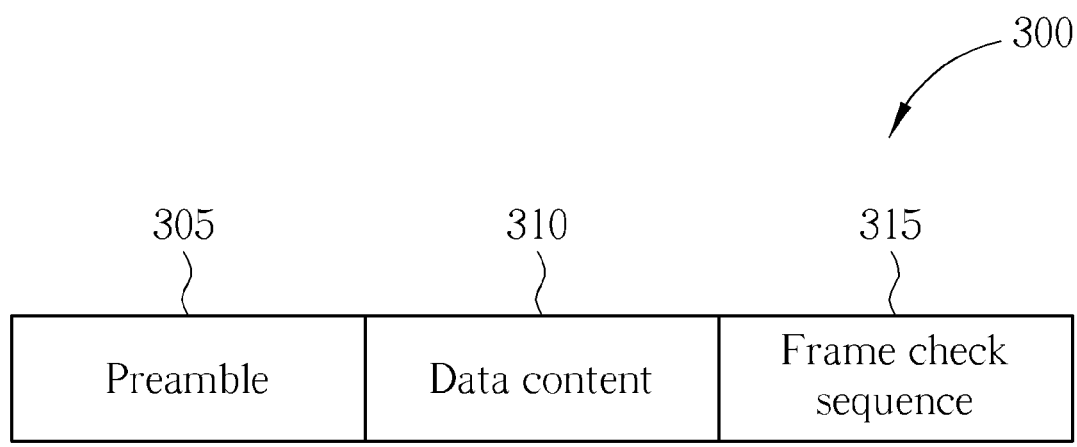
FIG. 3 is a diagram illustrating a format of negotiation packets used for forming a negotiation signal transmitted by the electronic apparatus as shown in FIG. 1.

As mentioned above, a negotiation signal in this embodiment is formed by a plurality of consecutive and identical negotiation packets such as ten consecutive and identical negotiation packets. The negotiation packets are configured as invalid packets for Ethernet channel transmission scheme so as to make a difference between normal data packets and negotiation packets. Thus, it is impossible for Ethernet channel to incorrectly determine transmission and reception of the negotiation packets as transmission and reception of normal data packets, and this design can avoid that the negotiation packets transmitted between the first and second sides are transferred to another electronic device. Please refer to FIG. 3. FIG. 3 is a diagram illustrating a format of negotiation packets 300 used for forming a negotiation signal transmitted by the electronic apparatus 100 as shown in FIG. 1. As shown in FIG. 3, the negotiation packet 300 includes a preamble portion 305, a data content portion 310, and a frame check sequence portion 315. The preamble portion 305 includes a byte having eight bits '01010101'. The bit '0' and bit '1' are interlaced to indicate a beginning of a negotiation packet. The data content portion 310 includes a plurality bits of acknowledgement information, bits of flow control parameters, and bits of Energy-Efficient Ethernet parameters, etc. The frame check sequence portion 315 is generated by calculating the data content portion 310, and is used for preventing from an error bit occurring in the data content portion 310. It should be noted that the negotiation packet 300 is configured to exclude a data field used for indicating that the negotiation packet is a normal data packet. For example, the exclude data field can be a start frame delimiter (SFD) which is also referred as to a start of frame. Since the negotiation packet 300 excludes such the data field, negotiation packets including the format shown in FIG. 3 is merely used in point-to-point communication (or negotiation). The negotiation packets are not treated as normal data packets by an electronic apparatus even though such the electronic apparatus does not have the negotiation function mentioned above. Thus, data transmission of Ethernet channel is not affected by the negotiation function provided by the embodiments of the disclosure.

As mentioned above, by sending a negotiation signal from each of the first and second sides to the other, when the electronic apparatus 100 determines that the electronic apparatus at the second side is establishing a negotiation with the electronic apparatus 100 itself and the electronic apparatus at the second side determines that the electronic apparatus 100 is establishing a negotiation with the electronic apparatus at the second side, this implies that the negotiation of Ethernet channel succeeds. The objectives of flow control and energy efficient can be easily achieved during transmission of normal data packets thereafter. Even though the negotiation of this embodiment is completed by sending multiple negotiation signals, this can improve the stability of negotiation for Ethernet channel transmission. Moreover, in other embodiments, the number of the negotiation signals sent from each of the first and second sides to the other can be appropriately adjusted/decreased to improve the performance of processing the negotiation signals. This modification also obeys the spirit of the disclosure.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:
1. A negotiation method used in a multimedia interface, comprising: transmitting a first negotiation signal from a first side to a second side during a first/second specific time period when receiving any negotiation signal transmitted from the second side for enabling a negotiation of an Ethernet channel; transmitting a second negotiation signal from the first side to the second side during a third specific time period after the first/second specific time period; and checking whether any negotiation signal from the second side is detected or not during the third specific time period for determining a result of the negotiation; wherein a time interval of the first specific time period is substantially identical to a time interval of the second/third specific time period, and a step of determining the result of the negotiation comprises: when the first side receives any negotiation signal: re-transmitting the second negotiation signal to the second side during a fourth specific time period; transmitting a fourth negotiation signal to the second side during a fifth specific time period; and checking whether the fourth negotiation signal from the second side is detected or not during the fifth specific time period to determine the result of the negotiation.

2. The negotiation method of claim 1, further comprising: transmitting a negotiation signal from the first side to the second side to enable the negotiation of the Ethernet channel before receiving any negotiation signal transmitted by the second side.

3. The negotiation method of claim 1, wherein the first negotiation signal is an initial negotiation signal generated by the first side and used to indicate that the first side does not establish a negotiation with the second side while the second side does not establish a negotiation with the first side; and, the second negotiation signal is used to indicate that the first side is establishing the negotiation with the second side while the second side does not establish the negotiation with the first side.

4. The negotiation method of claim 1, wherein the step of determining the result of the negotiation comprises: determining that the negotiation fails when determining that no negotiation signal from the second side during the third specific time period is detected.

5. The negotiation method of claim 1, wherein the third negotiation signal is used to indicate that the first side is establishing a negotiation with the second side; and, the fourth negotiation signal is used to indicate that the first side is establishing the negotiation with the second side and the second side is establishing a negotiation with the first side.

6. The negotiation method of claim 1, wherein the step of determining the result of the negotiation comprises: determining that the negotiation fails when the fourth negotiation signal transmitted from the second side is not detected during the fifth specific time period.

7. The negotiation method of claim 1, wherein the step of determining the result of the negotiation further comprises: when the first side receives the fourth negotiation signal transmitted from the second side: transmitting the fourth negotiation signal to the second side during a sixth specific time period; and determining that the negotiation succeeds.

8. The negotiation method of claim 1, wherein each negotiation signal comprises a plurality of identical packets each for recording acknowledgement information.

9. The negotiation method of claim 1, wherein the multimedia interface is a high-definition multimedia interface (HDMI) capable of processing a multimedia signal including video and audio.

10. An electronic apparatus used in a multimedia interface, comprising:
a first side, for transmitting or receiving a multimedia signal; and
a processing unit, coupled to the first side, for processing the multimedia signal;
wherein the processing unit determines to transmit a first negotiation signal from the first side to a second side during a first/second specific time period for enabling a negotiation of an Ethernet channel when receiving any negotiation signal transmitted from another device at the second side; and, the processing unit determines to transmit a second negotiation signal from the first side to the second side during a third specific time period after the first/second specific time period, and checks whether a negotiation signal sent from the second side is detected or not during the third specific time period for determining a result of the negotiation;
wherein a time interval of the first specific time period is substantially identical to a time interval of the third specific time period; when the first side receives a third negotiation signal during the third specific time period, the processing unit determines to re-transmit the second negotiation signal from the first side to the second side during a fourth specific time period and transmit a fourth negotiation signal from the first side to the second side during a fifth specific time period; and, the processing unit checks whether the fourth negotiation signal sent from the second side is detected during the fifth specific time period, to determine the result of the negotiation.

11. The electronic apparatus of claim 10, wherein the processing unit transmits a negotiation signal from the first side to the second side to enable the negotiation of the Ethernet channel before the first side receives a negotiation signal sent by the second side.

12. The electronic apparatus of claim 10, wherein the first negotiation signal is an initial negotiation signal generated by the first side and used to indicate that the first side does not establish a negotiation with the second side while the second side does not establish a negotiation with the first side; and, the second negotiation signal is used to indicate that the first side is establishing the negotiation with the second side while the second side does not establish the negotiation with the first side.

13. The electronic apparatus of claim 10, wherein the processing unit determines that the negotiation fails when the first side receives no negotiation signal sent from the second side during the third specific time period.

14. The electronic apparatus of claim 10, wherein the third negotiation signal is used to indicate that the first side is establishing a negotiation with the second side; and, the fourth negotiation signal is used to indicate that the first side is establishing the negotiation with the second side while the second side is establishing a negotiation with the first side.

15. The electronic apparatus of claim 10, wherein when the first side does not receive the fourth negotiation signal sent from the second side during the fifth specific time period, the processing unit determines that the negotiation fails.

16. The electronic apparatus of claim 10, wherein when the first side receives the fourth negotiation signal during the fifth specific time period, the processing unit determines to transmit the fourth negotiation signal from the first side to the second side during a sixth specific time period, and determines that the negotiation succeeds.

17. The electronic apparatus of claim 10, wherein each negotiation signal comprises a plurality of identical packets each for recording acknowledgement information.

18. The electronic apparatus of claim 10, wherein the multimedia interface is a high-definition multimedia interface capable of processing a multimedia signal including video and audio.

* * * * *